United States Patent [19]

Loucks

[11] 4,348,628
[45] Sep. 7, 1982

[54] ELECTRIC MOTOR ALTERNATING POWER SUPPLY FOR VEHICLES

[76] Inventor: Carl C. Loucks, 3009 Harding Way, Costa Mesa, Calif. 92626

[21] Appl. No.: 312,427

[22] Filed: Oct. 19, 1981

Related U.S. Application Data

[63] Continuation-in-part of Ser. No. 161,609, Jun. 20, 1980, abandoned.

[51] Int. Cl.³ .............................................. H02J 7/00
[52] U.S. Cl. .................................... 320/61; 180/65 R; 180/65 D; 318/139; 320/6; 290/16
[58] Field of Search ..................... 320/61, 2, 6, 10, 14, 320/19; 180/65 R, 65 D, 65 F; 290/16; 318/139

[56] References Cited

U.S. PATENT DOCUMENTS

| | | | |
|---|---|---|---|
| 3,477,536 | 11/1969 | Carini | 180/65 F |
| 3,845,835 | 11/1974 | Petit | 180/65 D |
| 3,949,289 | 4/1976 | Day | 320/6 |
| 4,025,860 | 5/1977 | Shibata et al. | 320/6 |

Primary Examiner—Reinhard J. Eisenzopf
Attorney, Agent, or Firm—Francis X. LoJacono

[57] ABSTRACT

An electric motor alternating power supply for vehicles to replace gas-fueled engines, wherein the power supply includes an electric motor having a transmission mounted thereto, the motor being operated by two alternating power circuits, each having a battery that is alternately charged and discharged in a regulated sequential order by a sensing voltage relay which activates a secondary relay between an open and a closed mode of operation; thus, while one circuit is operating the electric motor from its associated battery, the other circuit allows its associated battery to be recharged.

5 Claims, 1 Drawing Figure

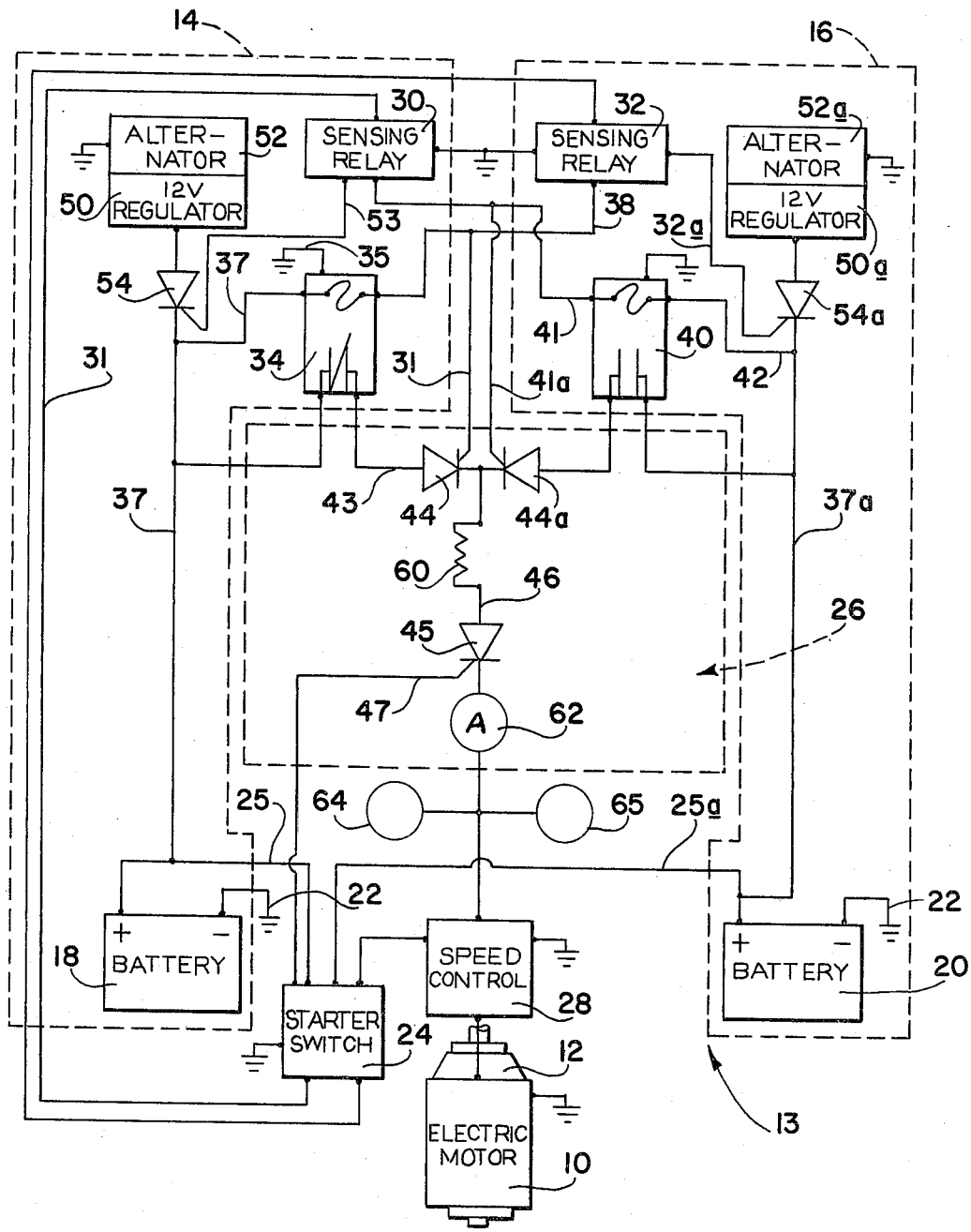

ELECTRIC MOTOR ALTERNATING POWER SUPPLY FOR VEHICLES

CROSS-REFERENCE TO RELATED APPLICATION

This application is a continuation-in-part of application Ser. No. 6/161,609 filed June 20, 1980, now abandoned, by the same inventor, Carl C. Loucks, and entitled ELECTRIC MOTOR ALTERNATING POWER SUPPLY FOR VEHICLES.

BACKGROUND OF THE INVENTION

1. Field of the Invention

This invention relates to a battery-operated power supply, and more particularly to a power-supply system having two alternating circuits to operate an electric motor.

2. Description of the Prior Art

As is well known in the art, various problems and difficulties have been encountered in seeking to provide an electrical system to operate an electric-motor vehicle. Most of the systems require large amounts of batteries having very complicated components to extend battery-life output before recharging is necessary. At present, research is being done to create new types of batteries in order to overcome inherent problems that presently exist in providing an electric power system for vehicles. However, there is no satisfactory system thus far available, to the applicant's knowledge, that allows an electrically operated vehicle to perform for substantially long periods of time over long distances.

SUMMARY AND OBJECTS OF THE INVENTION

The present invention as herein disclosed provides an electric-power system to drive a motor vehicle having an electric motor, the system including two circuits interrelated to alternately supply electric power to the motor, whereby one circuit is caused to provide electrical energy to the motor, while allowing the battery of the second circuit to be recharged. Thus, when the battery of the first circuit is low, the second circuit is alternately activated, thus allowing its battery to operate the motor, while the battery of the first circuit is then recharged. The alternating of the circuits is controlled by respective sensing-voltage relays that alternately activate secondary associated relays between an open and a closed mode.

Another object of the invention is to provide a power supply of this character, wherein each circuit includes an alternator and a voltage regulator acting under normal capacity when the particular circuit is in a battery-charging mode.

Still another object of the invention is to provide a power supply of this character that includes a speed-control device interposed between the energy input and the electric motor.

A further object of the invention is to provide a device of this type wherein the electric motor is provided with a transmission.

It is another object of the invention to provide a power-supply system that is easy to service and maintain, and is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWING

The drawing herein presented is a schematic box diagram indicating the basic components of the power-supply system having two alternating interacting circuits coupled to activate an electric motor.

DESCRIPTION OF THE PREFERRED EMBODIMENT

Referring more particularly to the drawing, there is schematically indicated an electric motor 10. Motor 10 can be any suitable type that would be capable of operating on a 12-volt DC current provided by any known 12-volt battery in use with a motor vehicle having a gas-operated engine. Mounted to the rear output of motor 10 is a transmission 12 of a suitable character that is adaptable for use with motor 10.

Electrical energy is supplied to motor 10 by the supply system, generally indicated at 13, which comprises first and second intregrated circuits, designated at 14 and 16, respectively. The circuits as proposed operated in an alternating arrangement, each circuit 14 and 16 depending upon its individual operating mode by the output condition of its associated battery.

Circuits 14 and 16 are both provided with individual batteries, as respectively indicated at 18 and 20. Battery 18 will be referred to as the first battery and battery 20 will be referred to as the second battery, corresponding to their first and second associated circuits 14 and 16.

Each battery is grounded at 22 in a normal manner, the positive side of battery 18 being connected to a master-starter switch 24 by line 25, and the positive side of battery 20 also being connected to the same starter switch 24 by line 25a.

As the master starter switch 24 is activated, one of the circuits becomes engaged to supply power through the circuit control unit, designated generally at 26, thereby placing the circuit in a discharge mode. Thus, motor 10 can be made operative by a speed-control means, indicated by box 28, which is connected to circuit control 26.

The remaining inactive circuit is at this time placed in a charging mode. Accordingly, as the battery is drained of its charge at a pre-selected low-voltage rate, the circuits will sense the difference in voltage values of the batteries and thus flip each circuit. That is, the charge mode of one circuit will change to a discharge mode; while the discharge mode of the other circuit will change to a charge mode. The alternating modes of the respective circuits will provide at least one sufficiently charged circuit at all times.

It should be noted that prior to the activation of switch 24 both circuits are in an open mode, the higher charged circuit being automatically closed to provide the necessary operating energy.

Each circuit includes a sensing-voltage relay. Circuit 14 is provided with sensing-voltage relay 30, and circuit 16 includes a sensing-voltage relay 32, each sensing relay 30 and 32 being connected to starter switch 24 by respective lines 31 and 33. Thus, the circuit having the greatest charge will become activated to provide energy to motor 10. Interposed between battery 18 of circuit 14 and sensing relay 32 of circuit 16 is a secondary power relay 34 (shown closed, and thus indicating that battery 18 has the greater charge potential). Secondary relay 34 is grounded at 35, and is connected to battery 18 through line 37 and to sensing relay 32 by line 38. Sensing relay 30 of circuit 14 is in turn connected to secondary power relay 40 of circuit 17 by line 41, the secondary relay 40 being further connected to battery 20 by line 37a. Note that at this time relay 40 is open; thus, energy from battery 20 cannot reach circuit-control unit 26. It is contemplated that sensing relays can be provided by a modified type 195 manufactured by General Electric.

As the first circuit 14 is closed at relay 34, energy flows through line 43 into a first input silicon-controlled rectifier (SCR) 44 which is activated by sensing relay 32 through line 31 connected to a second input SCR 45 by line 46, SCR 45 being activated by starter switch 24 through line 47. SCR 44 and 45 direct energy into speed control 28, the speed control 28 acting as a throttle using a modified SCR control (1c3012bh600) made by General Electric. It is also contemplated that SCR 44 will be provided by an SCR (mr1243-s1) (G. E.) and SCR 45 by a SCR (mr1243-s1-r) (G. E.). Thus, the rotational speed of motor 10 is controlled in a manner likened to that of a gas engine having a throttle.

As energy is being discharged through line 37 from battery 18, it is prevented from reaching regulator 50 and alternator 52 by an SCR 54 which is controlled by sensing relay 30 through line 53, allowing flow of current to be directed to battery 18 during the recharging mode.

Within circuit control 26, there is provided an SCR 44a which operates in the same manner as SCR 44. SCR 44a is activated by sensing relay 30 through line 41a, but controls the flow from the second circuit 16 during the charging mode of circuit 16.

Accordingly, as battery 18 reaches its pre-selected low-voltage output, the sensing relays 30 and 32 will sense the difference between the voltage charges of the respective batteries—and will cause relay 34 to open and relay 41 to close, thereby reversing the modes of the circuits 14 and 16. That is, circuit 14 enters a charging mode, whereby alternator 52 charges battery 18 through SCR 54 and circuit 16 becomes a discharging circuit. Thus, current is allowed to flow through relay 40 and SCR 44a in the same manner as above described for circuit 14. Battery 20 is connected to starter switch 24 by line 25a and to relay 40 by line 37a, SCR 54a acting in the same capacity as SCR 54 of circuit 14, 54a being activated by sensing relay 32.

Additional components can be provided within the system, such as a heat-switch means 60 and an ampshunt 62 within control circuit 26, including an ampmeter 64 and a voltmeter 65 positioned between the control circuit 26 and the speed control 28.

It should be understood that each alternator 52 and 52a will be suitably mounted so as to be operated by motor 10 in a conventional manner as when employed with a gas engine.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An electric power-supply system for powering a vehicle having an electric motor, comprising:
    an electric motor adapted to be energized by DC-current flow;
    a speed-control means operably connected to said motor to regulate the rotational speed of said motor;
    a first alternating circuit including a first battery and a first sensing-relay means;
    a second alternating circuit including a second battery and a second sensing-relay means, wherein said first and second alternating circuits are integrated with each other, whereby said sensing relays determine the charge or discharge mode of a given alternating circuit;
    a control circuit interconnected to said first and second alternating circuits, and interconnected between said speed-control means and said alternating circuits; and
    a starter switch connected to said speed-control means, and to said first and second batteries of said first and second circuits; and
    wherein said first sensing-relay means is interconnected to said second alternating circuit; and said second sensing-relay means is interconnected to said first alternating circuit, wherein said first sensing-relay means is adapted to sense the voltage output of said second battery to selectively provide a charge or discharge mode of said second alternating circuit; and wherein said second sensing-relay means is adapted to sense the voltage output of said first battery to selectively provide a charge or discharge mode of said first alternating circuit.

2. An electric power-supply system as recited in claim 1, wherein said first alternating circuit includes a first alternator and a first regulator having a first silicon-controlled rectifier activated by said first sensing means, to provide a charge to said first battery when said first alternating circuit is selectively positioned in said charge mode; and wherein said second alternating circuit includes a second alternator and a second regulator having a second silicon-controlled rectifier activated by said second sensing-relay means, to provide a charge to said second battery when said second alternating circuit is selectively positioned in said charge mode.

3. An electric power-supply system as recited in claim 2, wherein said first alternating circuit includes a first power-relay means interposed between said first battery and said second sensing-relay means, wherein said second relay means controls said first power-relay means; and wherein said second alternating circuit includes a second power-relay means interposed between said second battery and said first sensing-relay means, whereby said first sensing-relay means controls said second power-relay means.

4. An electric power-supply system as recited in claim 3, wherein said control circuit comprises:
    a first input silicon rectifier connected to said first power-supply relay means and activated by said second sensing-relay means;
    a second input silicon rectifier connected to said second power-supply relay means and activated by said first sensing-relay means; and
    a third silicon rectifier connected to both the first and second input silicon rectifiers and activated by said starter switch.

5. An electric power-supply system as recited in claim 4, wherein said control circuit includes:
    a heater switch; and
    an ampshunt connected to said third silicon rectifier.

* * * * *